United States Patent Office 3,689,297
Patented Sept. 5, 1972

3,689,297
METHOD OF INCORPORATING FILLERS IN CATIONIC BITUMINOUS EMULSIONS AND PRODUCTS PRODUCED THEREBY
Jack N. Dybalski, Chicago, and Robert D. Timmons, Tinley Park, Ill., assignors to Armour Industrial Chemical Company (a wholly owned subsidiary of Akzona Incorporated), Chicago, Ill.
No Drawing. Continuation-in-part of application Ser. No. 543,790, Apr. 20, 1966, which is a continuation-in-part of application Ser. No. 393,745, Sept. 1, 1964. This application Apr. 29, 1968, Ser. No. 725,202
Int. Cl. C08h 13/00, 17/22; C08j 1/46
U.S. Cl. 106—280
12 Claims

ABSTRACT OF THE DISCLOSURE

The method of preparing storage stable dispersions of fillers in aqueous cationic bituminous emulsions comprising pretreating finely divided filler material with an aqueous solution of certain monovalent salts and thereafter mixing the treated filler material with a cationic bituminous emulsion to obtain a dispersion of finely divided filler in the aqueous cationic bituminous emulsion, and dispersions produced by such a method. The storage stable dispersions obtained are useful as floor tile adhesives, roofing compositions, sound deadeners, protective coatings, insulating compositions and the like.

CROSS-REFERENCE TO RELATED APPLICATIONS

This application is a continuation-in-part of our copending application Ser. No. 543,790, filed Apr. 20, 1966, now abandoned which is a continuation-in-part of our application Ser. No. 393,745, filed Sept. 1, 1964, now abandoned.

Aqueous emulsions of bituminous materials are well known in the art. Such emulsions may be formulated using anionic or cationic emulsifiers. Emulsions formulated using anionic emulsifiers "break" when the water content falls below a certain level, as will occur due to evaporation and absorption of water by aggregate materials. Thus, the setting or depositing of such emulsions may require a considerable time and will tend to be rather variable. Various agents have been found useful to induce "breaking" of the anionic bituminous emulsion to hasten the depositing of bitumen from such systems. In contrast, the bituminous emulsions formulated using cationic emulsifiers do not "break" in the same manner as anionic emulsions, but rather the bituminous material is deposited from the emulsion due to the attraction of polar charges between the droplets and negatively charged surfaces. Therefore, it is seen that anionic and cationic aqueous bituminous emulsions are entirely different in their mode of action.

Cationic bituminous emulsions have achieved considerable acceptance in road building applications. The aqueous cationic bituminous emulsions themselves are relatively stable, and the emulsion stability may be enhanced by various additives well known in the art. The cationic bituminous emulsions, however, deposit on the surface of aggregate materials rapidly upon such materials being mixed with the emulsions. Asphalt from an aqueous cationic asphalt emulsion is deposited from the emulsion due to the charge attraction between the asphalt droplets and the aggregate materials. The rapid setting action of cationic bituminous emulsions is of considerable advantage in road building, such as seal coats, since the roads can be opened to traffic shortly after application of the asphalt. Although the rate of asphalt deposition from the emulsion can be controlled to some extent, the time required for complete deposition is never very long and it is therefore the practice to combined the cationic emulsion with the aggregate at the site of road construction, either on the surface of the road itself, or in a mobile mixer which permits the emulsion-aggregate mix to be rapidly spread. It can be readily recognized that due to the charge attraction mechanism, the rapidity of deposition of bituminous materials from the cationic emulsion is directly related to the generally negatively charged surface area of the aggregate or filler material. Thus, while a specific cationic asphalt emulsion might provide suitable properties for use in conjunction with aggregates, the same cationic emulsion may not exhibit suitable properties when used with very finely ground materials having vastly larger surface areas.

Since cationic bituminous emulsions have highly desirable water proofing and adhesive properties, it would be desirable to employ such emulsions as floor tile setting cements, roofing compositions, sound deadener compositions, insulating compositions and the like. Such applications, however, require the incorporation of finely-divided fillers in order to provide other desired properties such as firmness or mechanical strength when set, sound-proofing and insulation. If the filler compositions could be prepared at the point of use, and applied immediately after application, the incorporation of fillers would not be as serious a problem as it is. However, formulation at the site of use is not usually practical, and it is therefore desirable to prepare the complete filled composition at a central plant where the products are packaged and distributed through the channels of commerce to the ultimate users. It is, therefore, necessary to provide a method of preparing storage stable dispersions of fillers in aqueous cationic bituminous emulsions, which may be stored for more than six months or a year.

The major problem in preparing storage stable dispersions of finely-divided filler material in cationic bituminous emulsions is the prevention of coating the filler material with bitumen upon contact of the filler material with the cationic bituminous emulsion. When the bitumen coats the filler material, agglomerates of the finely-divided filler material are obtained and stable dispersions are not obtained. Most desired filler materials are finely-divided and thus present a large negatively charged surface area. Upon addition of such filler material to cationic bituminous emulsions, untreated filler becomes coated with bitumen in a very short period of time, forming agglomerates, and thus forming unstable emulsions in that the bitumen is removed from the emulsion and deposited on the filler material.

It is therefore the principal object of the present invention to provide a method of substantially overcoming the problems and difficulties described above. More specifically, it is an object of this invention to provide a method of preparing storage stable dispersions of negatively-charged fillers in aqueous cationic bituminous emulsions. Further objects and advantages will be indicated in the following detailed specification.

The process of this invention may be used with a wide variety of finely-divided fillers. The external surfaces of most common filler materials may be regarded as negatively-charged, since they have a preponderance of negatively-charged sites, and the average or net surface charge is therefore negative. The negative surface charge on finely divided materials, such as those commonly applied as inert fillers, is independent of the acidic or basic character of the material. For example, silica dust is an acidic mineral while ordinary limestone ($CaCO_3$) is a basic mineral, yet both limestone powder and silica dust comprise fillers with negatively-charged surfaces. Consequently, practically all mineral fillers including asbestos, slate flour, talc, silica dust, limestone powder, mica, and the like are suitable for use in the present invention, Many organic or vegetable fillers are also within the broad scope of the present invention. For example, materials such as ground cork, rubber crumbles, and the like may be used for their insulating or sound proofing properties, and lend themselves to processing by the method of the present invention. Cellulosic fillers, such as wood flour, or organic fillers such as pigments, coal dust, synthetic fillers and the like may also sometimes be employed, depending on the particular end use of the storage stable dispersions.

It will be noted from the above description of suitable fillers that the finely ground particles of filler are extremely small. Suitable particle sizes for fillers are well known in the art to be such that the greatest proportion of material will pass through a #200 sieve. Mineral dust is known as that material which does pass through a #200 sieve. Mineral fillers are recognized under ASTM Designation 546 as having the following mineral gradation requirements:

| Sieve size: | Percent passing by dry weight |
|---|---|
| 30 | 100 |
| 100 | 90 |
| 200 | 65 |

Such definitions and specifications have been set forth by The Asphalt Institute, and are clearly set forth in the manual "Introduction to Asphalt," Manual Series No. 5 (MS-5), Fourth Edition, November 1962. Thus, it is seen that the filler materials of this invention are of an entirely different character than coarse aggregates, which are retained on a #8 sieve, and even appreciably smaller than fine aggregate, which is recognized as material passing through a #8 sieve. Filler materials as coarse as retained on No. 20-50 sieve or coarser are obviously not suitable to form the dispersions of our invention since they would not be maintained in a dispersed state over long periods of time.

Thus, with respect to filler materials having discrete particles suitable for use in our invention, such as mineral fillers, it is seen that 100 percent of the particles must pass a size 30 sieve while at least 90 percent of the particles must pass a size 100 sieve. Therefore, the mineral fillers can be described as those of a particle size that at least 90 percent will pass a #100 sieve.

Also within the definition of finely divided fillers as called for by our process, we include very finely divided asbestos fibers known in the industry as "floats." "Floats" are fibers so fine and light that they are collected by air flotation. They are precipitated into float chambers by gravity, settling or collected by other filtering media. While asbestos floats are very small in size, presenting large surface areas, they can not be designated with respect to passing through specified size sieves due to their irregular shapes.

For preparing products such as roofing compositions, tile setting cements, and crack sealers, mineral fillers will ordinarily be employed, particularly siliceous mineral fillers, such as asbestos or slate flour. Such mineral fillers are very cheap and perform the desired function of imparting body or mechanical strength to the compositions. Where it is desired to employ the product as a sound deadener, powdered limestone may be used as the filler. Another advantageous filler for this purpose is "rubber crumbles" which is a scrap material obtained as part of tire re-capping operations. It is vulcanized rubber in the form of small-particles.

The present invention contemplates a pre-treatment procedure wherein the finely-divided filler material of the kind described is contacted with an aqueous solution of a treating agent which advantageously alters the surface charge of the filler material. In achieving the desired result, it has been found that the selection of the treating agent is of importance, and that the treating agent should be employed at a particular concentration in relation to the filler. More specifically, this invention contemplates the use of aqueous solutions of certain monovalent salts to advantageously alter the surface charge characteristic of the filler before it is incorporated in the cationic emulsion.

The preferred treating agents are nitrate, nitrite, chloride or sulfate salts of sodium, potassium, and ammonium. Examples of specific salts useful in practicing the present invention are: ammonium nitrate, sodium nitrate, sodium nitrite, potassium nitrite, potassium nitrate, sodium chloride, potassium chloride, ammonium chloride, ammonium nitrite, ammonium sulfate, sodium sulfate, and potassium sulfate. Particularly good results are obtained with the chloride and nitrite salts, such as sodium chloride and sodium nitrite.

In order to obtain storage stable dispersions according to this invention it will usually be desirable to employ the monovalent salt in an amount within the range from about 0.1 to 25 parts by weight per hundred parts of the filler. In many applications, the preferred quantity will range from .5 to 10 parts per hundred parts of filler. The concentration of the filler in the final product may vary over a considerable range depending on the particular application of the product. For example, the products may contain from about 5 to 65 percent of the filler based on the total weight of the final product. For applications such as roofing compositions, tile setting cements and crack sealers, filler will usually be incorporated in an amount ranging from 5 to 20 percent of the final product, while in other applications such as in the preparation of sound deadeners, the filler may comprise from 50 to 65 percent of the product.

Quaternary ammonium compounds may be employed as an additional agent for pre-treatment of the filler. Water-soluble quaternary ammonium compounds containing at least one quaternary ammonium group and an aliphatic hydrocarbon group of from 8 to 22 carbon atoms are generally suitable. From the standpoint of availability and performance, the quaternary ammonium compounds containing aliphatic hydrocarbon groups of from 12 to 18 carbons are preferred. Similarly, the monoquaternaries are preferred, although poly-quaternaries, such as the di-quaternaries, can also be used. The aliphatic polyethoxylated mono- and di-quaternaries are also suitable. Such quaternaries may contain up to 10 moles of ethylene oxide groups per mole of quaternary, but they will usually contain from one to five moles.

The following quaternary compounds are illustrations of those usable in the present invention:

(1) The alkyl and alkyl polyalkoxylated quaternary ammonium compounds represented by the formula

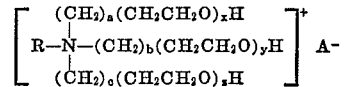

wherein R is an aliphatic hydrocarbon containing from 12 to 22 carbons; $a$, $b$, and $c$ are integers of from 1 to 2 when the corresponding $x$, $y$, or $z$ is 0; $x$, $y$, and $z$ are integers of from 1 to 4 when the corresponding $a$, $b$, or $c$ is 0, with the total of $x$, $y$, and $z$ not exceeding 10, and preferably not exceeding 5; and A is an anion, such as $CH_3OSO_3^-$, $NO_2^-$, $NO_3^-$, $Cl^-$, $Br^-$, or $OH^-$, the valency of the anion being equal to the valency of the cationic group.

(2) The alkyl and alkyl polyalkoxylated diquaternary ammonium compounds illustrated by the general formula

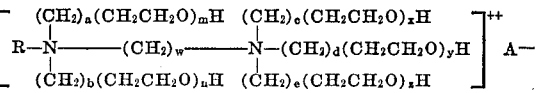

wherein R is an aliphatic hydrocarbon containing from 12 to 22 carbons; $a$, $b$, $c$, $d$, and $e$ are integers of from 1 to 2 when the corresponding $m$, $n$, $x$, $y$, or $z$ is 0; $m$, $n$, $x$, $y$, and $z$ are integers of from 1 to 5 when the corresponding $a$, $b$, $c$, $d$ or $e$ is 0, with the total of $m$, $n$, $x$, $y$, and $z$ not exceeding 15, and preferably 8; $w$ is an integer of from 2 to 4; and A is one or more anions such as $CH_3OSO_3^-$, $NO_2^-$, $SO_4^{--}$, $NO_3^-$, $Cl^-$, $Br^-$, or $OH^-$, the number of anions providing valences equal to the quaternary cationic valence.

The quaternary treating agent may be employed in an amount ranging from about .05 to 2.0 parts by weight of the quaternary per hundred parts of the filler. In many applications, the preferred range will be from 0.1 to 0.5 part of the quaternary per part of the filler. It will be understood that the quaternary cations are the effective portions of the treating agents.

The aqueous solution of the pre-treating agent, containing the monovalent salt—either alone or in combination with the quaternary ammonium compound—is brought into intimate contact with the finely-divided filler material. While the concentration of the aqueous solution is not particularly critical, enough of the aqueous carrier should be employed to thoroughly wet the external surfaces of the filler particles. On the other hand, it is not desirable to employ excess water, since excess water may make it more difficult to achieve the desired formulation of the final product, unless some of the water is removed prior to combination with the bituminous emulsion. This consideration applies particularly to highly filled products such as sound deadeners, where the diluting effect of the water is particularly inconvenient. By way of illustration, a five to ten percent solution of the monovalent salt can be used, and mixed with the filler material until the material is wetted. No special mixing equipment is required, the usual blending or mixing equipment being suitable. Usually, the quantity of aqueous solution employed will be less than that required to form a slurry. As indicated, the important consideration is that the external surfaces of the filler material are wetted with the treating agent.

In the next step of the method, the wetted filler material is mixed with the cationic bituminous emulsion. As previously indicated, the proportions and specific formulation will depend on the end use. The cationic bituminous emulsions which are suitable are those which are characterized by having a continuous aqueous phase, a dispersed bituminous phase, and a cationic emulsifier for the bituminous phase. The dispersed "bitumen" or "bituminous phase" may be asphalt or other similar bituminous or resinous material, such as the plastic residues from coal, coal tar distillation, petroleum pitch, petroleum resins, plastic-modified petroleum resins, etc. The bitumen will ordinarily be employed in a concentration within the range from 20 to 80 percent by weight of the emulsion, while the more usual concentration will range from 50 to 70 percent.

In general those cationic emulsifiers can be used which have been found to be effective for forming oil-in-water bituminous emulsions. These include N-alkyl polymethylene and N-alkyl polymethylene mono- and poly-ethoxylated diamines, the amido amines, heterocyclic amines and the alkyl and alkyl polyethoxylated quaternary and diquaternary ammonium compounds. Such cationic emulsifiers and the procedure for forming oil-in-water bituminous emulsions therewith are well known in the art. Various modifiers and stabilizers may also be incorporated in the emulsions.

In certain embodiments, the same cationic emulsifier can be used for forming the bituminous emulsion as in the combination pre-treatment of the filler. For example, the emulsifier can be a quaternary or a diquaternary compound as set out above in Formulas 1 and 2. The bituminous emulsions before combination with the filler may contain from 0.1 to 5% by weight of the quaternary emulsifier, and preferably from 0.5 to 2% by weight.

We have found that incorporation of the treating agent in the aqueous cationic bituminous emulsion and the addition of the filler material to the emulsion does not give satisfactory results. Addition of finely-divided filler material, as used in our process, to the emulsion, especially in amounts more than about 50 weight percent, does not result in storage stable dispersions of the filler material in the cationic bituminous emulsion system. On the contrary, much of the filler material almost immediately becomes coated with bitumen and agglomeration results. Therefore, the pre-treatment step is necessary to provide suitable commercial products of dispersions of finely-divided fillers in aqueous cationic bituminous emulsions. Specifically, as the desired quantity of filler increases, such as from about 50 to 70 weight percent filler as is desired for uses such as automobile undercoatings, we have found the pre-treatment step to be necessary.

This invention is further illustrated in the following examples:

Example I

A sound deadener composition was prepared by treating 36 parts by weight of finely ground (minus 200 mesh) limestone with 4 parts by weight of a 25% aqueous solution of sodium nitrate. The solution was mixed with the limestone until the particles were thoroughly wetted with the solution. The wetted limestone was then mixed with 60 parts by weight of an aqueous cationic bituminous emulsion. The emulsion contained 64% asphalt as the dispersed phase and 32.4% water as the continuous phase. The emulsifying agent was 2% tallow trimethyl ammoniumchloride, and 0.1% calcium chloride, 1.0% concentrated hydrochloric acid, and 0.5% hydroxyethyl-cellulose (nonionic) (Natrosol 250 MR, Hercules Powder Company) were included in the emulsion prior to being combined with the wetted limestone. The aqueous cationic emulsion was adjusted to 75% solids using calcium chloride.

Example II

A filled coating composition was prepared by treating 30 parts by weight of finely ground (minus 200 mesh) limestone mixed with 7 parts by weight of asbestos fiber floats (Johns-Manville Company 7TF1) with 11 parts by weight of a 10% aqueous solution of sodium nitrite. The wetted limestone and asbestos filler was then mixed with 52 parts by weight of an aqueous cationic bituminous emulsion. The emulsion contained 65% Viadon (petroleum polypropylene resin, Humble Oil & Refining Company) as the dispersed phase and 34% water as the continuous phase. The emulsifying agent was N-tallow, N,N-dimethyl N',N',N' trimethyl 1,3-propylene diammonium chloride employed at a concentration of 0.75%, based on the emulsion. Calcium chloride in the amount of 0.1% was included in the emulsion prior to being combined with the wetted limestone and asbestos.

Example III

An insulation coating composition was prepared by pre-treating 12.3 parts by weight of asbestos fiber floats (Johns-Manville Company 7TF1) mixed with 5 parts by weight of granulated cork (No. 14, 9 pound density) with 12.3 parts of water and 1 part by weight of a 40% aqueous solution of sodium nitrite. The wetted filler was then mixed with 69.4 parts by weight of an aqueous cationic bituminous emulsion. The emulsion contained 65% asphalt as the dispersed phase and 34% water as the continuous phase. The emulsifying agent was 0.75% N-tallow, N,N-dimethyl N',N',N' trimethyl 1,3-propylene diammonium chloride, and 0.1% calcium chloride and 0.05% hydroxyethyl cellulose (Natrosol) was included in the emulsion.

Example IV

A roof coating composition was prepared by treating 12 parts by weight of asbestos floats (Johns-Manville Company 7TF1) with 41 parts by weight of a 1.25% aqueous solution of ammonium chloride. The wetted asbestos was then mixed with 47 parts by weight of an aqueous cationic bituminous emulsion. The emulsion contained 60% asphalt as the dispersed phase and 37% water as the continuous phase. The emulsifying agent was 1% N-tallow, propylene diamine, and 1% concentrated hydrochloric acid and 0.5% calcium chloride was added to the emulsion. The emulsion was combined with the pre-treated wetted asbestos and 3% butyl latex, based upon the total filled emulsion weight, was added to the filler formulation.

Example V

A roof coating was prepared by pre-treating 9 parts by weight of blue-black slate flour (325 mesh) mixed with 2.4 parts asbestos fiber floats (Johns-Manville 7FT1) with 31.6 parts by weight of an aqueous solution containing 3% ammonium chloride and 1.5% N-tallow-N,N-dimethyl N',N',N'-trimethyl 1,3-propylene diammonium chloride. The wetted filler was then mixed with 57 parts by weight of an aqueous cationic bituminous emulsion. The emulsion contained 65% asphalt as the dispersed phase and 31% water as the continuous phase. The emulsifying agent was N-tallow, N,N-dimethyl N',N',N'-trimethyl 1,3-propylene diammonium chloride, and 0.1% calcium chloride was included in the emulsion. In formulating the cationic emulsion, 3% butyl latex was added to the water phase prior to emulsification.

Example VI

A tile adhesive was prepared by pre-treating 6 parts by weight of asbestos fiber floats (Johns-Manville Company 7TF1) mixed with 3.5 parts blue-black slate flour (100% passing #200 mesh) with 10.5 parts by weight of an aqueous solution containing 10% sodium chloride. The wetted filler was then mixed with 80 parts by weight of an aqueous cationic bituminous emulsion. The emulsion contained 65% asphalt as the dispersed phase and 34% water as the continuous phase. The emulsifying agent was N-tallow, N,N-dimethyl N',N',N' trimethyl 1,3-propylene diammonium chloride. To the complete formulation was added 2%, based on the total formulation weight, butyl latex pre-treated with a 1% aqueous solution of N-tallow, N,N-dimethyl N',N',N' trimethyl 1,3-propylene diammonium chloride, on the basis of the weight of latex. Also added to the completed formulation was 2%, based on weight of the total formulation, of a 10% aqueous solution of aluminum chloride.

Example VII

A high filled sound deadener composition was prepared by pre-treating 59.5 parts by weight of finely-ground (minus 200 mesh) limestone mixed with 2 parts by weight Tamal SN (neutral sodium salt of a complex condensed aryl organic acid sold by Rohm and Haas) with 11 parts by weight of an aqueous solution containing 10% sodium nitrite. The wetted filler was then mixed with 27.5 parts by weight of an aqueous cationic bituminous emulsion. The emulsion contained 65% asphalt as the dispersed phase and 34% water as the continuous phase. The emulsifying agent was N-tallow, N,N-dimethyl N',N',N' trimethyl 1,3-propylene diammonium chloride, and 0.05% Natrosol was included in the emulsion. To the filled emulsion formulation was added 3% asbestos fiber floats, based upon the total filled emulsion weight.

While in the foregoing specification this invention has been described in relation to certain specific embodiments thereof and many details have been set forth for purposes of illustration, it will be apparent to those skilled in the art that the invention is susceptible to additional embodiments and that many of the details set forth herein can be varied considerably without departing from the basic principles of the invention.

We claim:

1. The method of preparing storage dispersions, remaining stable for at least six months, of negatively-charged fillers in aqueous cationic asphalt emulsions by preventing adhesion of asphalt to the filler materials, comprising wetting the external negatively-charged surfaces of finely-divided filler material selected from the group consisting of asbestos, slate flour, talc, silica dust, limestone powder, mica, ground cork, rubber crumbles, wood flour, and coal dust of which at least 90 percent of the particles of each of the members of each group pass #100 sieve and asbestos floats and intimately combining therewith, by mixing, an aqueous solution of an inorganic salt selected from the nitrate, nitrite, chloride, and sulfate salts of sodium, potassium, and ammonium, from 0.1 to 25 parts by weight of said salt being employed per 100 parts of said filler, and thereafter mixing the wetted filler material with a cationic asphalt emulsion having a continuous aqueous phase, a dispersed asphalt phase of 20 to 80 weight percent of said emulsion, and as a cationic emulsifier for the asphalt phase N-tallow, N,N - dimethyl-N',N',N'-trimethyl 1,3-propane diammonium dichloride, said filler comprising from about 5 to 65 weight percent of the final composition of dispersed filler material in an aqueous cationic asphalt emulsion which is storage stable.

2. The dispersions produced by the method of claim 1.

3. The method of claim 1 wherein said filler material is wetted with an aqueous solution containing N-tallow, N,N-dimethyl-N',N',N'-trimethyl 1,3-propane diammonium dichloride in addition to the salt, from .05 to 2 parts by weight of the diquaternary diammonium dichloride compound being employed per 100 parts by weight of the filler.

4. The method of claim 3 wherein from 0.1 to 0.5 part by weight of the diquaternary diammonium dichloride compound is employed per 100 parts by weight of the filler.

5. The method of claim 1 wherein the salt is employed in an amount from 0.5 to 10 parts by weight of the salt per 100 parts of the filler.

6. The method of claim 5 wherein the salt is sodium nitrite.

7. The method of claim 1 wherein the salt is selected from the chloride, nitrate, and nitrite salts of sodium and ammonium.

8. The method of claim 1 wherein the salt is sodium nitrite.

9. The method of claim 1 wherein the salt is sodium chloride.

10. The method of claim 1 wherein the greatest portion of said filler passes a #200 sieve.

11. The method of claim 1 wherein the filler is asbestos floats.

12. The method of claim 1 wherein the filler comprises from about 50 to 65 weight percent of the final composition.

References Cited

UNITED STATES PATENTS

| | | | |
|---|---|---|---|
| 2,760,878 | 8/1956 | Lhorty | 106—277 X |
| 2,775,530 | 12/1956 | Gagle et al. | 106—280 |
| 2,861,004 | 11/1958 | Sucetti | 106—277 |
| 3,000,750 | 9/1968 | Felleetschin | 106—308 N |
| 3,014,810 | 12/1961 | Dybalski et al. | 106—308 N |
| 3,063,853 | 11/1962 | Sucetti | 106—277 X |
| 3,093,595 | 6/1963 | Levy et al. | 106—277 X |
| 3,220,593 | 11/1965 | Borgfelder | 106—277 X |
| 3,236,671 | 2/1966 | Dybalski et al. | 106—277 X |
| 3,243,311 | 3/1966 | Rogers et al. | 106—280 |
| 3,359,738 | 12/1967 | Dybalski et al. | 106—277 X |

FOREIGN PATENTS

| | | | |
|---|---|---|---|
| 645,098 | 7/1962 | Canada | 106—277 |
| 775,917 | 5/1957 | Great Britain | 106—277 |

JOAN B. EVANS, Primary Examiner

U.S. Cl. X.R.

94—20, 23; 117—168; 252—311.5; 260—28; 106—282, 283, 308 B, 308, 309, 287 SS